(12) United States Patent
Stanford et al.

(10) Patent No.: US 10,740,574 B1
(45) Date of Patent: Aug. 11, 2020

(54) RFID TAGS ENFORCING PERSISTENCE WHILE POWERED

(71) Applicant: Impinj, Inc., Seattle, WA (US)

(72) Inventors: Theron Stanford, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/531,292

(22) Filed: Aug. 5, 2019

Related U.S. Application Data

(63) Continuation-in-part of application No. 15/716,945, filed on Sep. 27, 2017, now Pat. No. 10,373,038.

(60) Provisional application No. 62/400,590, filed on Sep. 27, 2016.

(51) Int. Cl.
*G06K 7/10* (2006.01)

(52) U.S. Cl.
CPC ..... *G06K 7/10217* (2013.01); *G06K 7/10138* (2013.01)

(58) Field of Classification Search
CPC ........... G06K 7/10217; G06K 7/10138; G06K 19/0723; G06K 19/07309; G06K 7/0008; G06K 7/10019; G06K 7/10198; G06K 19/0677; G06K 19/0707; G06K 19/0708; G06K 19/0709; G06K 19/071; G06K 7/10009

USPC .............................................. 340/10.1, 10.34
See application file for complete search history.

(56) References Cited

U.S. PATENT DOCUMENTS

| | | | |
|---|---|---|---|
| 6,942,155 B1 | 9/2005 | Stewart et al. | |
| 9,411,992 B1 | 8/2016 | Marek et al. | |
| 10,373,038 B1 * | 8/2019 | Stanford | G06K 7/10019 |
| 2004/0145454 A1 | 7/2004 | Powell et al. | |
| 2005/0237844 A1 | 10/2005 | Hyde | |
| 2006/0001525 A1 * | 1/2006 | Nitzan | G06K 19/0702 340/10.1 |
| 2008/0018467 A1 | 1/2008 | Estevez et al. | |
| 2008/0068131 A1 | 3/2008 | Cargonja et al. | |
| 2009/0015386 A1 | 1/2009 | Kang et al. | |
| 2013/0186959 A1 | 7/2013 | Smith | |
| 2014/0028352 A1 | 1/2014 | Chung | |
| 2014/0061303 A1 * | 3/2014 | Brandl | G06K 7/10059 235/385 |
| 2014/0070010 A1 * | 3/2014 | Diorio | G06K 19/07773 235/492 |
| 2015/0371066 A1 | 12/2015 | Weidinger | |

\* cited by examiner

*Primary Examiner* — Edwin C Holloway, III
(74) *Attorney, Agent, or Firm* — Hertzberg, Turk & Associates, LLC

(57) ABSTRACT

RFID tags may compensate for non-RFID power sources by automatically enforcing data or state persistence even while powered. A tag may measure a time interval between successive detected modulated reader transmissions. If the interval exceeds a minimum time, then the tag may deassert a protocol flag, erase data, and/or change tag operating states, even if the tag would normally not perform these actions while powered.

20 Claims, 7 Drawing Sheets

RFID TAG IC COMPONENTS

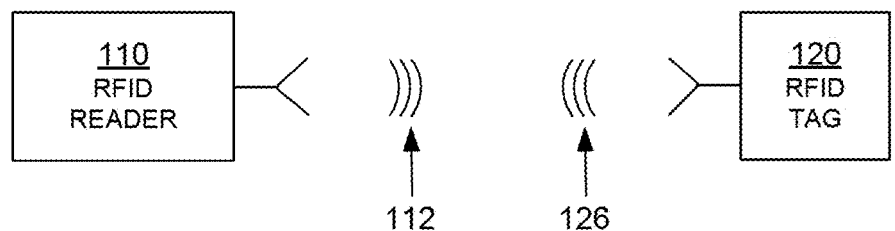
FIG. 1
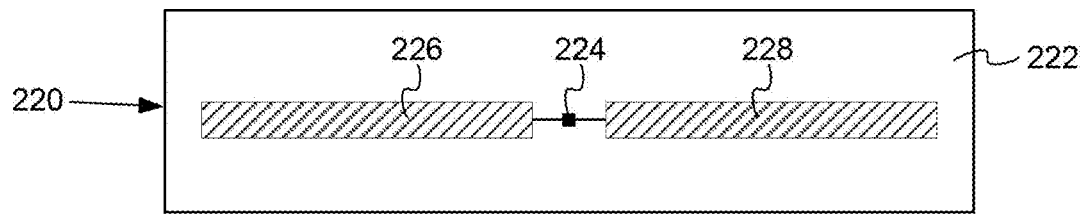
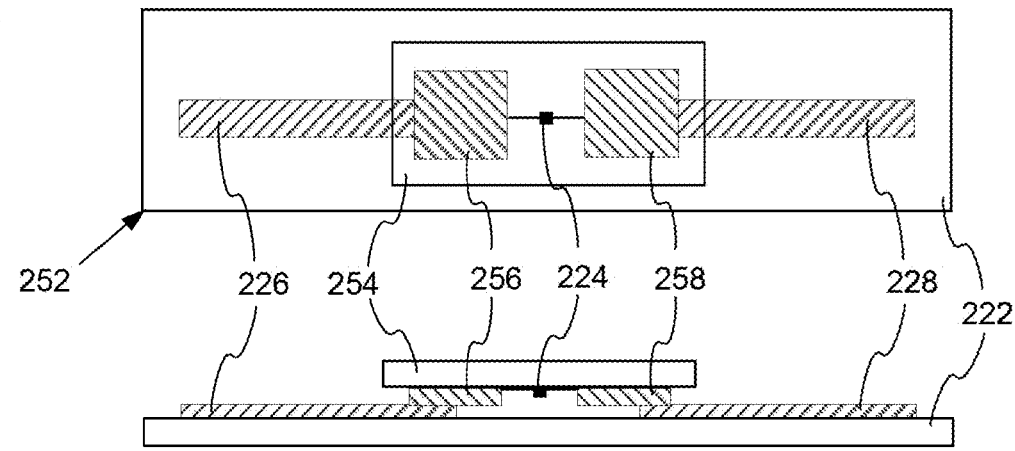
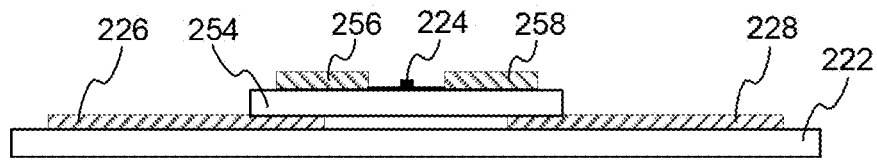
FIG. 2

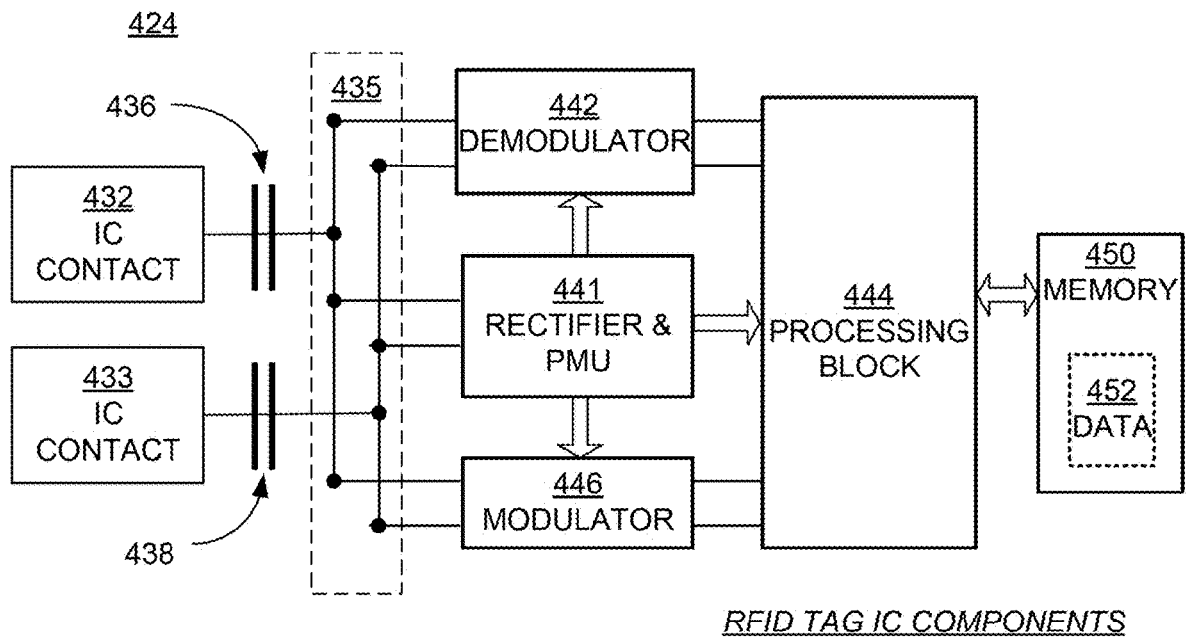
FIG. 4
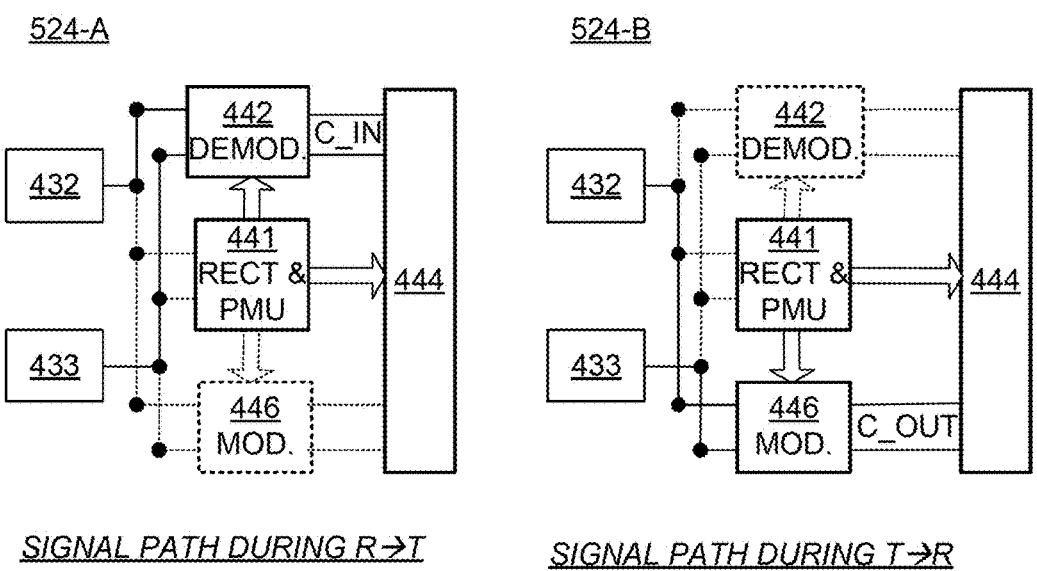
FIG. 5A  FIG. 5B

| Flag | Time to Set | Required persistence |
|---|---|---|
| S0 inventoried flag | ≤ 2ms regardless of initial or final value[3] | Tag energized: Indefinite<br>Tag not energized: None |
| S1 inventoried flag[1] | ≤ 2ms regardless of initial or final value[3] | Tag energized:<br>    Nominal temperature range: 500ms ≤ persistence < 5s<br>    Extended temperature range: Not specified<br>Tag not energized:<br>    Nominal temperature range: 500ms ≤ persistence < 5s<br>    Extended temperature range: Not specified |
| S2 inventoried flag[1] | ≤ 2ms regardless of initial or final value[3] | Tag energized: Indefinite<br>Tag not energized:<br>    Nominal temperature range: 2s ≤ persistence<br>    Extended temperature range: Not specified |
| S3 inventoried flag[1] | ≤ 2ms regardless of initial or final value[3] | Tag energized: Indefinite<br>Tag not energized:<br>    Nominal temperature range: 2s ≤ persistence<br>    Extended temperature range: Not specified |
| Selected (SL) flag[1] | ≤ 2ms regardless of initial or final value[3] | Tag energized: Indefinite<br>Tag not energized:<br>    Nominal temperature range: 2s ≤ persistence<br>    Extended temperature range: Not specified |
| C flag[1,2] | Deassert: ≤ 2ms[3]<br>Assert: ≤ 0ms measured relative to the first rising edge of the Tag's response indicating that the Tag has finished its computation | Tag energized: Indefinite<br>Tag not energized:<br>    Nominal temperature range: 0s ≤ persistence < 5s<br>    Extended temperature range: Not specified |
| Optional security timeout | < $T_{1(min)}$ (see Table 6.16), measured relative to the last rising edge of the last bit of the Interrogator command that caused the security timeout. | Tag energized[4]:<br>    Nominal temperature range: 20ms ≤ persistence < 200ms<br>    Extended temperature range: Not specified<br>Tag not energized[4]:<br>    Nominal temperature range: 20ms ≤ persistence < 200ms<br>    Extended temperature range: Not specified |

RFID TAGS ENFORCING PERSISTENCE WHILE POWERED

CROSS REFERENCE TO RELATED APPLICATIONS

This application is a continuation-in-part of U.S. patent application Ser. No. 15/716,945 filed on Sep. 27, 2017, which in turn claims the benefit of U.S. Provisional Patent Application Ser. No. 62/400,590 filed on Sep. 27, 2016. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID tags compensating for non-RFID power sources by automatically enforcing data or state persistence even while powered. A tag may measure a time interval between successive detected modulated reader transmissions. If the interval exceeds a minimum time, then the tag may deassert a protocol flag, erase data, and/or change tag operating states, even if the tag would normally not perform these actions while powered.

According to a first example, an RFID integrated circuit (IC) configured to selectively deassert an asserted flag that, absent such selective deassertion or a reader command to deassert the flag, would remain asserted while the IC has sufficient power to operate, is provided. The IC includes a demodulator block and a processing block coupled to the demodulator block. The demodulator block may be configured to detect modulated reader transmissions and demodulate reader commands from at least a subset of the modulated reader transmissions. The processing block may be configured to receive a first reader command via the demodulator block and assert the protocol flag in response to receiving the reader command. While the IC has sufficient power to operate, the processing block may be configured to determine whether a time interval between detecting a first modulated reader transmission and a second modulated reader transmission exceeds a minimum time, and if so then deassert the asserted protocol flag despite the IC having sufficient power to operate.

According to a second example, an RFID integrated circuit (IC) configured to selectively erase stored data that, absent such selective erasing or a reader command to erase the data, would be retained while the IC has sufficient power to operate, is provided. The IC includes a memory configured to store the data, a demodulator block, and a processing block coupled to the memory and the demodulator block. The demodulator block may be configured to detect modulated reader transmissions and demodulate reader commands from at least a subset of the modulated reader transmissions. The processing block may be configured to receive a first reader command via the demodulator block and store data in the memory in response to receiving the reader command. While the IC has sufficient power to operate, the processing block may be configured to determine whether a time interval between detecting a first modulated reader transmission and a second modulated reader transmission exceeds a minimum time, and if so then erase the stored data despite the IC having sufficient power to operate.

According to a third example, an RFID integrated circuit (IC) configured to selectively transition between first and second operating states whereby, absent such selective transitioning or a reader command to transition states, the IC would remain in the first operating state while the IC has sufficient power to operate, is provided. The IC includes a demodulator block and a processing block coupled to the demodulator block. The demodulator block may be configured to detect modulated reader transmissions and demodulate reader commands from at least a subset of the modulated reader transmissions. The processing block may be configured to receive a first reader command via the demodulator block and transition to the first operating state in response to receiving the reader command. While the IC has sufficient power to operate, the processing block may be configured to determine whether a time interval between detecting a first modulated reader transmission and a second modulated reader transmission exceeds a minimum time, and if so then transition from the first operating state to the second operating state despite the IC having sufficient power to operate.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 6 depicts persistence times for protocol flags according to the Gen2 Protocol.

DETAILED DESCRIPTION

Figure 3:
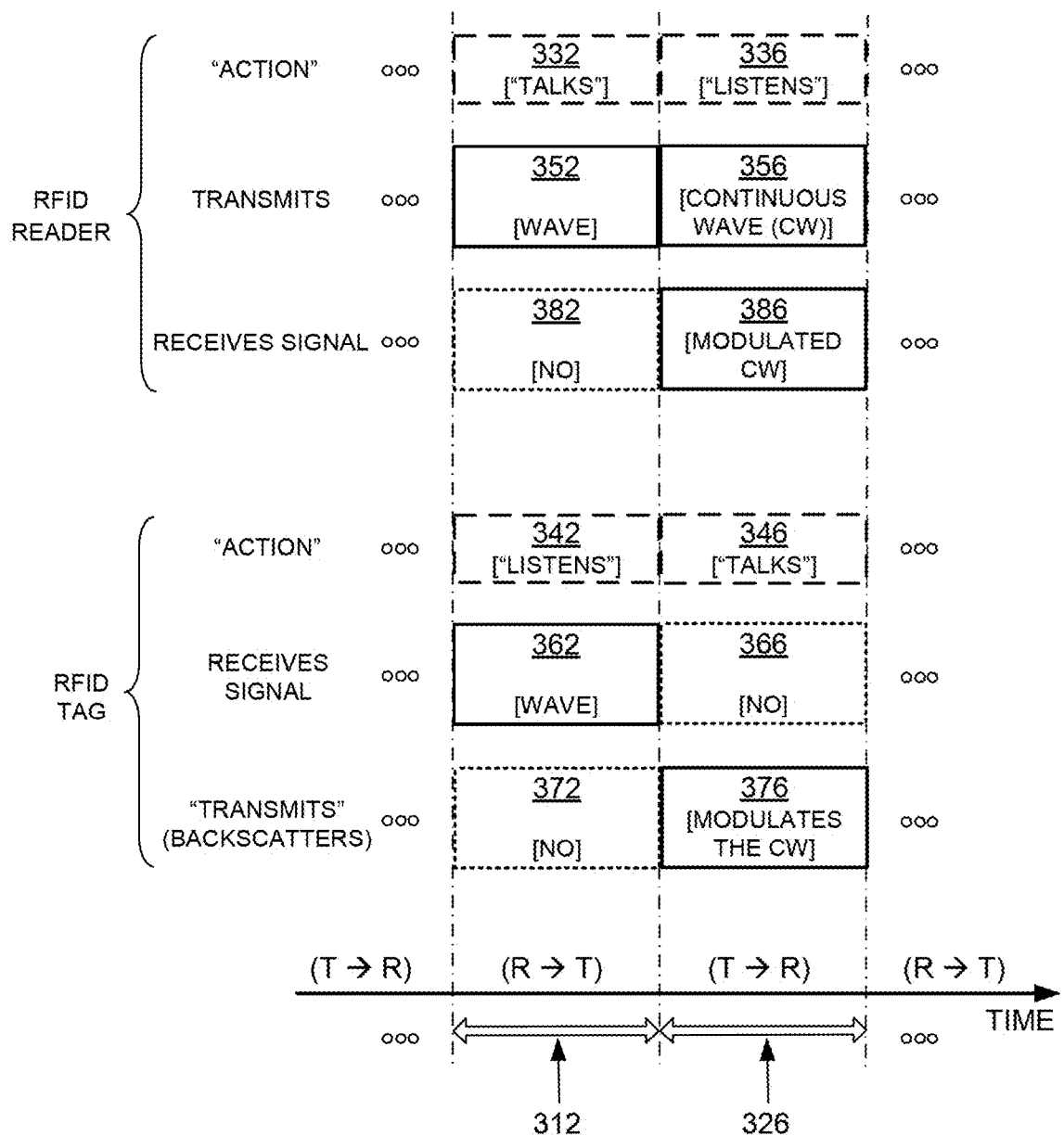
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0 and 2.0 of which are hereby incorporated by reference. A protocol specifies, in part, symbol encodings, and may include a set of modulations, rates, timings, or any other parameter associated with data communications. In addition, a protocol can be a variant of a stated specification such as the Gen2 Protocol, for example including fewer or additional commands than the stated specification calls for, and so on. In such instances, additional commands are sometimes called custom commands.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 includes a diagram 200 of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath strap substrate 254 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course, interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments, IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of the IC during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be configured to both detect modulated reader transmissions and demodulate reader commands from the detected modulated reader transmissions. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Protocol mentioned above. In embodiments where circuit 424 includes multiple demodulators and/or modulators, each may be configured to support different protocols or different sets of protocols.

As mentioned previously, embodiments are directed to RFID tags automatically enforcing data or state persistence. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented as described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Passive RFID tags often encounter situations where power is suddenly lost. For example, if an RFID reader executes a frequency hop where it changes the frequency of its transmitted signal, tags that were previously receiving power from the reader may suddenly be unable to extract sufficient power from the reader signal at the new frequency to operate, therefore losing power. As another example, a tag that is moved away from a reader may be unable to harvest sufficient power to operate from reader signals and may lose power. To mitigate such situations, passive RFID tags and communication protocols for passive tags may be designed to accommodate sudden power loss relatively gracefully. For example, tags may be configured to automatically re-initialize or transition to a power-up state after a sudden interruption of power.

Given that loss of operating power is relatively common for passive RFID tags, communication protocols for passive RFID tags may include certain aspects or features designed around expected power loss. For example, the Gen2 Protocol specifies that certain protocol flags are to be implemented on Gen2-compliant tags for selection, inventorying, and other operations. A flag may be implemented using registers or other forms of memory, both volatile and non-volatile, and can be switched from a first value to at least one other value. In some embodiments, a flag may be configured with a default value. When the flag is switched to a value different from its default value, it may eventually decay or transition to its default value. The transition to the default value may be characterized by a persistence time that indicates how long the flag will hold a particular value before decaying or transitioning to the default value.

Some communication protocols, such as the Gen2 Protocol, require that protocol flags have particular persistence times. FIG. 6 depicts persistence times for protocol flags according to the Gen2 Protocol. Diagram 600, which reproduces Table 6.20 of the Gen2 Protocol, depicts various parameters for relevant flags of the Gen2 Protocol. In particular, column 610 depicts the persistence time requirements for different protocol flags in different tag power conditions. For example, an S2 inventoried flag of a tag, also referred to as an S2 flag, is required by the Gen2 Protocol to have an indefinite persistence time when the tag is energized or powered, and is required to have a persistence time greater than two seconds when the tag is not energized and is in a nominal temperature range. RFID tag IC manufacturers may design tag ICs to implement S2 flags with persistence time slightly greater than two seconds when not energized, in order to comply with the Gen2 Protocol without excessive power consumption or circuit complexity.

In some embodiments, RFID tag inventorying processes may be designed to take advantage of these protocol-specified flag persistence times. For example, an inventorying process involving multiple readers, each inventorying tags by causing the tags to switch their S2 flags from a default state to a second state, may not require that readers subsequently cause the inventoried tags to switch their S2 flags back to the default state. Instead, the process may assume that tags will undergo unpowered transitions significantly greater than two seconds between different readers, and that their Gen2-compliant S2 flags will therefore automatically decay to their default values.

Other RFID tag processes may also take advantage of expected power loss. For example, RFID tags ICs may include volatile memory configured to store data, possibly in response to one or more preceding reader commands. The stored data may be sensitive data, such as data associated with cryptographic operations or interactions (e.g., partially encrypted or decrypted data, temporary cryptographic key information, and the like). Volatile memory requires power to maintain stored data and will maintain the stored data indefinitely if power is provided and the memory is not damaged, unless or until a tag IC adjusts or erases the stored data, for example based on a received reader command or some other tag IC determination. When a power loss occurs, the volatile memory will not be powered and any data stored in the volatile memory, sensitive or otherwise, is automatically erased or cleared, thereby reducing the likelihood of inadvertent or malicious data loss.

As another example, RFID tag ICs may be configured to transition between different operating states upon power interruption. In one embodiment, RFID tag ICs may be configured to exit a current operating state and return to an initialization, power-up, or ready state upon power interruption. Instead of manually (e.g., via sent commands) causing such tags to transition from the operating state to the initialization, power-up, or ready state, readers may interrupt power to achieve the same effect. In another embodiment, RFID tag ICs may be configured to transition between operating states with different restrictions. For example, suppose an RFID tag IC's normal operating state is a public state, in which access to tag IC features or information is restricted. The RFID tag IC can be placed in a private state, in which a reader or entity can access some or all tag IC features or information, by suitable authentication or verification of the reader or entity. This is similar to the disclosure of commonly assigned U.S. patent application Ser. No. 16/056,382 filed on Aug. 6, 2018, hereby incorporated by reference in its entirety. Upon power interruption, an RFID tag IC in the private state may be configured to transition to the public state, in order to prevent unauthenticated or unverified entities from accessing the tag IC.

However, unpowered transitions cannot always be assured. For example, unanticipated readers within the environment may provide power, preventing tag S2 flags from decaying to their default values or sensitive data in volatile memory from being automatically erased. Even if readers within the environment can be controlled, other non-reader sources of RF signals may be present. These sources may radiate non-reader RF signals with frequencies near those used by RFID systems. RFID tags that are broadly tuned (in other words, tuned to couple to RF signals with frequencies at or near those used by RFID systems) to maximize power harvesting may consequently harvest power from these non-reader signals. Accordingly, such RFID tags may remain powered even when no RFID readers are transmitting, potentially disrupting inventorying processes that rely on unpowered protocol flag persistence times and exposing sensitive data stored in volatile memory.

Figure 7:
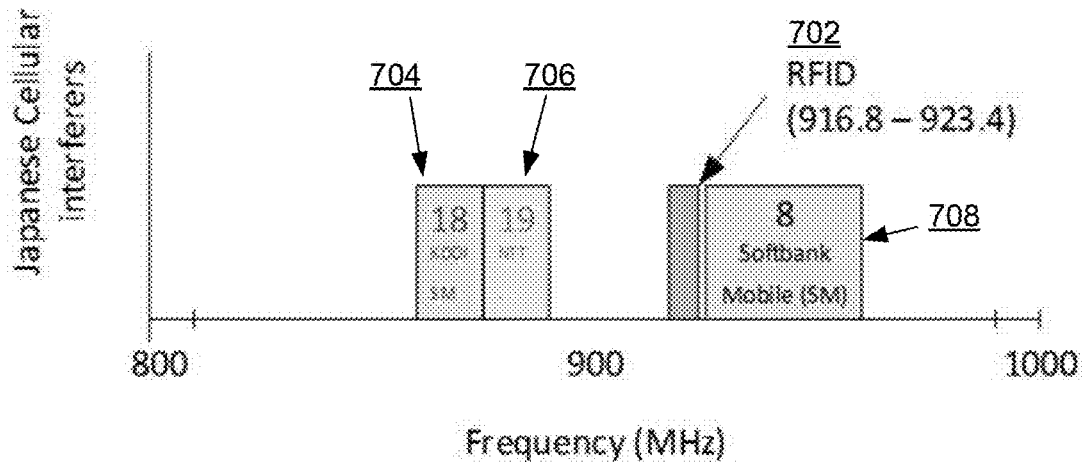
FIG. 7 depicts frequencies used for RFID applications relative to example frequencies used for other applications.

FIG. 7 depicts frequencies used for RFID applications relative to example frequencies used for other applications. Chart 700 depicts Japanese cellular interferers as compared to frequencies 702 used for Japanese RFID application. RFID frequencies 702 fall within the frequency range 916.8 MHz-923.4 MHz. Some frequencies near RFID frequencies 702 are used by cellular/mobile service providers. For example, frequencies 704, corresponding to band 18 and falling within the frequency range 860 MHz-875 MHz, are used by the Japanese telecommunications providers KDDI and Softbank Mobile (SM). Frequencies 706, corresponding to band 19 and falling within the frequency range 875 MHz-890 MHz, are used by NTT DoCoMo, another Japanese telecommunications provider. Frequencies 708, corresponding to band 8 and falling within the frequency range 925 MHz-960 MHz, are also used by Softbank Mobile. Other frequency bands near RFID frequencies 702, such as bands 5 (869 MHz-894 MHz), 6 (875 MHz-885 MHz), and 20 (791 MHz-821 MHz), may be used by other mobile service providers. RF signals in the range of frequencies 704-708, although different from RFID frequencies 702, may be able to power RFID tags configured to operate in frequencies 702.

In many cases, signals from cellular towers, even those of similar radio frequency to RFID signals, are too weak to power most commercial RFID tags. However, mobile service providers may install base stations (also known as microcells or picocells) in areas that receive poor coverage from towers, such as within buildings or underground. In these cases, the signals from the base stations may be strong enough to power nearby RFID tags, even if no RFID readers are transmitting. If RFID readers are present and attempting to inventory the tags, the inventory process may be disrupted by the power provided by the base stations.

While cellular base stations are described above, other power sources may also cause inventory process disruption, depending on RFID tag tuning. In essence, any RF source that can power RFID tags may cause inventory process disruption. In some embodiments, an RFID tag IC may be directly connected or coupled to a power source, such as a DC power source, which may also disrupt inventorying processes and tag operations.

The effect of other power sources on RFID tag inventorying and operation may be mitigated by having a tag IC automatically enforce some form of data or state persistence upon (a) receiving sufficient power to operate, and (b) determining that an active RFID reader (i.e., an RFID reader that is sending commands) has not been detected for some time. For example, a tag IC may be configured to measure a time interval between successive detected reader RF signals, or between the assertion of a protocol flag and a subsequent detected reader RF signal. If the time interval exceeds a preset or dynamic minimum time, but the tag IC continues to detect an RF signal and possibly harvest power from the RF signal, then the tag IC may determine that the RF signal either originates from a non-reader source or a reader that is not active. The minimum time may be based on a desired flag persistence time (e.g., a Gen2-specified minimum flag persistence time), a desired data retention time, and/or any other desired time limit. The tag IC may be configured to measure the time interval using an analog flag structure, an analog or digital timer/counter, or any suitable means for measuring elapsed time.

After the time interval exceeds the minimum time, the tag IC may then deassert (i.e., change the value of) one or more asserted protocol flags, erase some data stored in memory (e.g., cryptographic state data such as partially-decrypted data, partially-encrypted data, temporary keys, partial keys, and the like; data about a state of operation of the tag IC; or similar), and/or transition between different tag IC states (e.g., to an initialization, power-up, or ready state, from a private state to a public state, or between any suitable tag IC states). Specifically, the tag IC selectively changes its flags, data, and/or current operating state despite or in spite of the fact that normally those flags and data would be unaltered and the tag IC would remain in its current operating state when the tag IC has sufficient power to operate.

Figure 8:
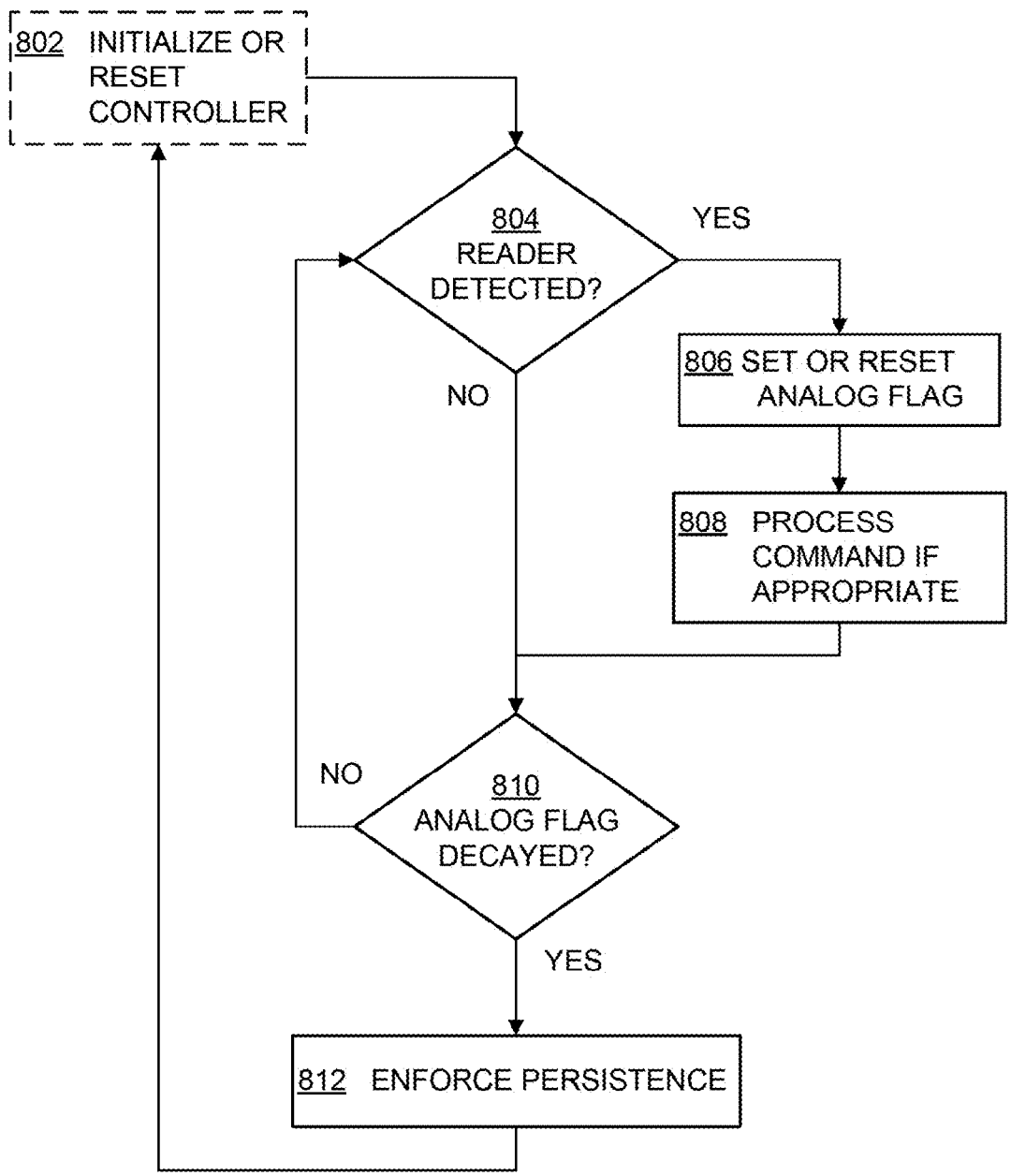
FIG. 8 depicts a process for using an analog flag to enforce persistence according to embodiments.

FIG. 8 depicts a process 800 for using an analog flag to enforce persistence according to embodiments. Process 800, which may be performed by an RFID tag or tag IC, begins at step 802, where a controller of the tag initializes or resets itself, for example as a result of receiving sufficient power to operate. Step 802 is not optional when the controller previously lacked sufficient power to operate, but is optional otherwise, for example after step 812 described below. An RFID tag IC has sufficient power to operate when it can change one or more of its flag values, change data stored in volatile memory, and/or change its operating state. In process 800, the RFID tag or tag IC is continually powered even if active RFID readers are not present or detected, for example by harvesting power from non-reader RF sources, inactive but transmitting readers, or via some other power source.

After controller initialization, at step 804 the controller may determine whether an RFID reader is detected, using any suitable technique. In some embodiments, the controller determines whether a reader is detected based on whether a modulated reader transmission has been detected (for example, via a demodulator). A modulated reader transmission is an RF signal that has been modulated by a reader to carry information. For example, a modulated reader transmission may include a protocol command. A protocol command refers to a command that is intended to be compliant with a communication protocol, whether the command is correctly formed or malformed. The successful demodulation of a protocol command from an RF signal (e.g., by a demodulator such as demodulator 442) indicates the presence of an active RFID reader. As another example, a modulated reader transmission may include or be an amplitude-modulated RF signal. Some RFID communication protocols specify that readers transmit commands by amplitude-modulating RF waves. For example, the Gen2 Protocol specifies that readers communicate with RFID tags by modulating an RF carrier wave using double-sideband amplitude-shift keying (DSB-ASK), single-sideband ASK (SSB-ASK), or phase-reversal ASK (PR-ASK). Detection of an amplitude-modulated RF signal (e.g., by a demodulator and/or the controller) may indicate the presence of an active RFID reader. Accordingly, the controller may detect a reader if either (1) a protocol command has been detected or (2) an amplitude-modulated RF signal has been detected.

If the controller determines that an RFID reader is detected, then at step 806 the controller may set or reset the analog flag to an initial value, for example by charging the analog flag. If charging, the controller may set the analog flag to a power supply voltage VDD of the tag by charging the analog flag using the power supply voltage VDD, or may set/charge the analog flag to any other suitable voltage. The analog flag may be a capacitor-type structure configured to hold charge and to leak or lose charge at a known rate. Accordingly, the time it takes for the analog flag to decay from a first voltage value to a second voltage value via charge leakage is correlated to the known leakage rate and the first voltage value. In some embodiments, the flag initial value may change between consecutive received commands and/or instances of detected readers.

After step 806, at step 808 the controller may process any received command (or cause the received command to be processed) if the command is appropriate (e.g., is of the correct protocol, correctly formed, includes valid parameters, etc.) and directed to the RFID tag IC. If a received command is not appropriate or not directed to the IC, then the controller may ignore the command.

After steps 806 and 808 (if appropriate), or if the controller determines at step 804 that an RFID reader is not detected, the controller proceeds to step 810. At step 810, the controller may determine whether the analog flag has decayed to a particular threshold value. The threshold value may be set at tag or IC manufacture or may be dynamically determined. If the controller determines that the analog flag has not decayed to the threshold value, then the controller may return to step 804 to again determine whether an RFID reader is detected. If no RFID readers are detected and the analog flag has not yet decayed, the controller may repeat steps 804 and 810 periodically, based on a timer, or dynamically as conditions allow. For example, the controller may perform steps 804 and 810 less frequently when the analog flag value is relatively close to the initial value set at step 806, and may perform steps 804 and 810 more frequently when the analog flag value is close to the threshold value (in other words, when the analog flag is about to decay to the threshold value).

If at step 810 the controller determines that the analog flag has decayed to or below the threshold value, at step 812 the controller may enforce some flag, memory, and/or state persistence. To enforce flag persistence, the controller may reset one or more of the tag IC's protocol flags to their default values, mimicking the behavior of a tag that has been unpowered for longer than the persistence times of the protocol flags. To enforce the persistence of memory other than any used for protocol flags, the controller may erase or clear data stored in one or more portions of tag memory, such as data used in a cryptographic interaction or data used to track current tag state. If the persistence enforcement in step 812 involves transitioning from the current tag operating state to a different state, the controller may do so. For example, the controller may transition from (or cause the tag IC to transition from) a current operating state to an initialization, power-up, or ready state. As another example, the controller may transition from (or cause the tag IC to transition from) a private state to a non-private or public state. In one embodiment, the controller may transition to an initialization, power-up, or ready state by proceeding to optional step 802, where it resets itself. Subsequently, the controller may return to step 804. If the persistence enforcement in step 812 does not involve a controller reset, the controller may skip optional step 802 and proceed directly to step 804. In some embodiments, the controller may transition from a current operating state to another state without resetting.

Figure 9:
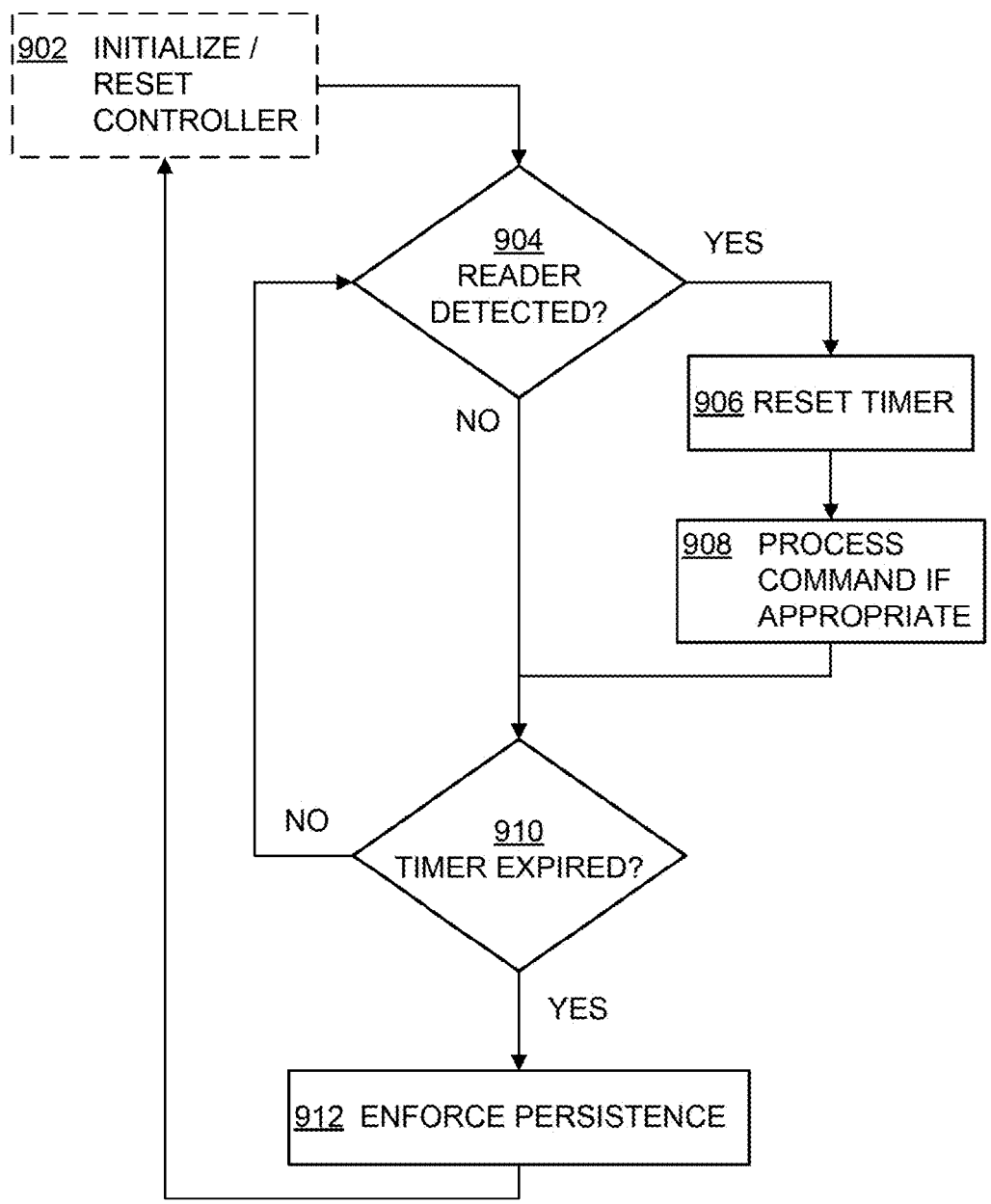
FIG. 9 depicts a process for using a timer to enforce persistence according to embodiments.

FIG. 9 depicts a process 900 for using a timer to enforce persistence according to embodiments. Process 900, which may be performed by an RFID tag or tag IC, begins at step 902, where a controller of the tag initializes, for example as a result of receiving sufficient power to operate. Step 902 is not optional when the controller previously lacked sufficient power to operate, but is optional otherwise, for example after step 912 described below. In process 900, the RFID tag or tag IC is continually powered even if active RFID readers are not present, for example by harvesting power from non-RFID-reader RF sources or via some other power source.

After controller initialization, at step 904 the controller may determine whether an RFID reader is detected, like step 804 in process 800. If the controller determines that a reader is detected, then at step 906 the controller sets or resets the timer to an initial value and causes the timer to begin decrementing. In some embodiments, the controller may set or reset the timer to a zero value and cause the timer to begin incrementing to a threshold value. The initial or threshold value may be predetermined, for example at tag or tag IC manufacture, or may be dynamically determined. In some embodiments, the initial or threshold value may change between consecutive received commands and/or instances of detected readers. The timer may be implemented as a digital counter or in any other suitable way. The decrement or increment process may be controlled by the controller or by the timer itself.

After step 906, at step 908 the controller may process (or cause to be processed) any received command if the command is appropriate and directed to the tag IC. Otherwise, the controller may ignore the received command.

After steps 906 and 908 (if appropriate), or if the controller determines at step 904 that an RFID reader is not detected, the controller proceeds to step 910. At step 910, the controller may determine whether the timer has expired. The controller may consider the timer expired if the timer value is zero or has reached a particular threshold value. If the controller determines that the timer has not expired, then the controller may return to step 904 to determine whether an RFID reader has now been detected. If no RFID readers are detected and the timer has not yet expired, the controller may repeat steps 904 and 910 periodically, based on the current timer value, or dynamically as conditions allow. For example, the controller may perform steps 904 and 910 less frequently when the timer value is relatively close to the original value set at step 906, and may perform steps 904 and 910 more frequently when the timer value is close to the threshold value (in other words, when the timer is about to expire).

If at step 910 the controller determines that the timer has expired, at step 912 the controller may enforce flag, memory, and/or state persistence, similar to step 812 in FIG. 8. If the persistence enforcement in step 912 involves transitioning from a current tag operating state to a different state, the controller may do so. For example, the controller may transition from (or cause the tag IC to transition from) a current operating state to an initialization, power-up, or ready state by proceeding to optional step 902, where it resets itself. As another example, the controller may transition from (or cause the tag IC to transition from) a private state to a non-private or public state, with or without resetting itself. Subsequently, the controller may return to step 904. If the persistence enforcement in step 912 does not involve a controller reset, the controller may skip optional step 902 and proceed directly to step 904. In some embodiments, the controller may transition from a current operating state to another state without resetting.

The operations described in processes 800 and 900 are for illustrative purposes only. These operations may be implemented using additional or fewer operations and in different orders using the principles described herein.

According to a first example, an RFID integrated circuit (IC) configured to selectively deassert an asserted flag that, absent such selective deassertion or a reader command to deassert the flag, would remain asserted while the IC has sufficient power to operate, is provided. The IC includes a demodulator block and a processing block coupled to the demodulator block. The demodulator block may be configured to detect modulated reader transmissions and demodulate reader commands from at least a subset of the modulated reader transmissions. The processing block may be configured to receive a first reader command via the demodulator block and assert the protocol flag in response to receiving the reader command. While the IC has sufficient power to operate, the processing block may be configured to determine whether a time interval between detecting a first modulated reader transmission and a second modulated reader transmission exceeds a minimum time, and if so then deassert the asserted protocol flag despite the IC having sufficient power to operate.

According to a second example, an RFID integrated circuit (IC) configured to selectively erase stored data that, absent such selective erasing or a reader command to erase the data, would be retained while the IC has sufficient power to operate, is provided. The IC includes a memory configured to store the data, a demodulator block, and a processing block coupled to the memory and the demodulator block. The demodulator block may be configured to detect modulated reader transmissions and demodulate reader commands from at least a subset of the modulated reader transmissions. The processing block may be configured to receive a first reader command via the demodulator block and store data in the memory in response to receiving the reader command. While the IC has sufficient power to operate, the processing block may be configured to determine whether a time interval between detecting a first modulated reader transmission and a second modulated reader transmission exceeds a minimum time, and if so then erase the stored data despite the IC having sufficient power to operate.

According to a third example, an RFID integrated circuit (IC) configured to selectively transition between first and second operating states whereby, absent such selective transitioning or a reader command to transition states, the IC would remain in the first operating state while the IC has sufficient power to operate, is provided. The IC includes a demodulator block and a processing block coupled to the demodulator block. The demodulator block may be configured to detect modulated reader transmissions and demodulate reader commands from at least a subset of the modulated reader transmissions. The processing block may be configured to receive a first reader command via the demodulator block and transition to the first operating state in response to receiving the reader command. While the IC has sufficient power to operate, the processing block may be configured to determine whether a time interval between detecting a first modulated reader transmission and a second modulated reader transmission exceeds a minimum time, and if so then transition from the first operating state to the second operating state despite the IC having sufficient power to operate.

According to embodiments, the processing block may be configured to determine that a modulated reader transmission has been detected by determining that an amplitude-modulated RF signal has been detected and/or determining that a reader command has been received. The IC may further include a rectifier configured to harvest the sufficient power to operate from RF signals. The RF signals may originate from a microcell and/or a picocell. According to some embodiments, the second modulated reader transmission may be in a first radio frequency range and the rectifier may be configured to harvest power from a non-reader source in a second radio frequency range different from the first radio frequency range. The minimum time may be based on a protocol-specified persistence time for a protocol flag. The stored data may be cryptographic state information. The first operating state may be a private state and the second operating state may be a public state in which IC access is more restrictive than in the private state.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) integrated circuit (IC) configured to selectively deassert an asserted protocol flag that, absent such selective deassertion or a reader command to deassert the asserted protocol flag, would remain asserted while the IC has sufficient power to operate, the IC comprising:
   a demodulator block configured to:
      detect modulated reader transmissions; and
      demodulate reader commands from at least a subset of the modulated reader transmissions; and
   a processing block coupled to the demodulator block and configured to:
      receive, via the demodulator block, a first reader command;
      assert the protocol flag in response to receiving the first reader command; and
      while the IC has sufficient power to operate:
         determine whether a time interval between detecting a first modulated reader transmission and detecting a second modulated reader transmission exceeds a minimum time; and
         if the time interval exceeds the minimum time, then deassert the asserted protocol flag despite the IC having sufficient power to operate.

2. The RFID IC of claim 1, wherein the processing block is configured to determine that a modulated reader transmission has been detected by determining that an amplitude-modulated RF signal has been detected.

3. The RFID IC of claim 1, wherein the processing block is configured to determine that a modulated reader transmission has been detected by determining that a reader command has been received.

4. The RFID IC of claim 1, further comprising a rectifier configured to harvest the sufficient power to operate from RF signals.

5. The RFID IC of claim 4, wherein the RF signals originate from at least one of a microcell and a picocell.

6. The RFID IC of claim 4, wherein:
   the second modulated reader transmission is in a first radio frequency range; and
   the rectifier is configured to harvest power from a non-reader source in a second radio frequency range different from the first radio frequency range.

7. The RFID IC of claim 1, wherein the minimum time is based on a protocol-specified persistence time for the asserted protocol flag.

8. A Radio Frequency Identification (RFID) integrated circuit (IC) configured to selectively erase stored data that, absent such selective erasing or a reader command to erase the data, would be retained while the IC has sufficient power to operate, the IC comprising:
a memory configured to store the data;
a demodulator block configured to:
  detect modulated reader transmissions; and
  demodulate reader commands from at least a subset of the modulated reader transmissions; and
a processing block coupled to the memory and the demodulator block and configured to:
  receive, via the demodulator block, a first reader command;
  store data in the memory in response to receiving the first reader command; and
  while the IC has sufficient power to operate:
    determine whether a time interval between detecting a first modulated reader transmission and detecting a second modulated reader transmission exceeds a minimum time; and
    if the time interval exceeds the minimum time, then erase the stored data despite the IC having sufficient power to operate.

9. The RFID IC of claim 8, wherein the processing block is configured to determine that a modulated reader transmission has been detected by determining that an amplitude-modulated RF signal has been detected.

10. The RFID IC of claim 8, wherein the processing block is configured to determine that a modulated reader transmission has been detected by determining that a reader command has been detected.

11. The RFID IC of claim 8, wherein the stored data is cryptographic state information.

12. The RFID IC of claim 8, further comprising a rectifier configured to harvest the sufficient power to operate from RF signals.

13. The RFID IC of claim 12, wherein the RF signals originate from at least one of a microcell and a picocell.

14. The RFID IC of claim 12, wherein:
the second modulated reader transmission in a first radio frequency range; and
the rectifier is configured to harvest power from a non-reader source in a second radio frequency range different from the first radio frequency range.

15. A Radio Frequency Identification (RFID) integrated circuit (IC) configured to selectively transition between a first and a second operating states whereby, absent such selective transitioning or a reader command to transition states, the IC would remain in the first operating state while the IC has sufficient power to operate, the IC comprising:
a demodulator block configured to:
  detect modulated reader transmissions; and
  demodulate reader commands from at least a subset of the modulated reader transmissions; and
a processing block coupled to the demodulator block and configured to:
  receive, via the demodulator block, a first reader command;
  transition to the first operating state in response to receiving the first reader command; and
  while the IC has sufficient power to operate:
    determine whether a time interval between detecting a first modulated reader transmission and detecting a second modulated reader transmission exceeds a minimum time; and
    if the time interval exceeds the minimum time, then transition from the first operating state to the second operating state despite the IC having sufficient power to operate.

16. The RFID IC of claim 15, wherein the processing block is configured to determine that a modulated reader transmission has been detected by determining that an amplitude-modulated RF signal has been detected.

17. The RFID IC of claim 15, wherein the processing block is configured to determine that a modulated reader transmission has been detected by determining that a reader command has been detected.

18. The RFID IC of claim 15, further comprising a rectifier configured to harvest power from RF signals.

19. The RFID IC of claim 18, wherein the RF signals originate from at least one of a microcell and a picocell.

20. The RFID IC of claim 15, wherein the first operating state is a private state and the second operating state is a public state in which IC access is more restrictive than in the private state.

* * * * *